(12) United States Patent
Wynter

(10) Patent No.: US 7,559,514 B1
(45) Date of Patent: Jul. 14, 2009

(54) PLUMBER'S CADDY

(76) Inventor: Walter Wynter, 556 Hollister St., Apt. C9, P.O. Box 232, Stratford, CT (US) 06615

( * ) Notice: Subject to any disclaimer, the term of this patent is extended or adjusted under 35 U.S.C. 154(b) by 246 days.

(21) Appl. No.: 11/412,392

(22) Filed: Apr. 28, 2006

(51) Int. Cl.
   *A47J 47/16* (2006.01)
(52) U.S. Cl. .............. 248/145.6; 248/346.06; 206/427
(58) Field of Classification Search .......... 248/682, 248/346.01, 311.2, 313, 309.1, 346.06, 346.5, 248/144, 145.6, 145, 202.1; 206/427, 557, 206/564; 224/148.7, 679, 682, 251, 926, 224/931
   See application file for complete search history.

(56) References Cited

U.S. PATENT DOCUMENTS

| 2,868,519 | A | * | 1/1959 | Tocci ........................ 366/209 |
| 2,882,087 | A | | 4/1959 | Socke |
| 3,680,752 | A | | 8/1972 | Wilson |
| 5,390,888 | A | | 2/1995 | Rogers |
| 5,620,094 | A | | 4/1997 | Naumann |
| 5,992,624 | A | | 11/1999 | Hodson |
| D430,729 | S | | 9/2000 | Boyette et al. |
| 6,354,475 | B1 | * | 3/2002 | Grace et al. ................. 224/158 |

* cited by examiner

*Primary Examiner*—A. Joseph Wujciak, III
(74) *Attorney, Agent, or Firm*—Crossley Patent Law; Mark A. Crossley

(57) ABSTRACT

A plumber's caddy is provided which carries two quart-sized containers. A hinge joins the front holder to the rear holder. The handle pivotally engages the eyes of the rear holder. The handle is comprised of two opposed risers joined by the extrusion. The semi-circular handle is fitted with the freely rotating tube for user comfort, so that the tube can be gripped with the handle free to rotate within the tube. The front holder is held to the rear holder via wing nuts tightened to threads of the bolts.

17 Claims, 3 Drawing Sheets

PLUMBER'S CADDY

BACKGROUND OF THE INVENTION

Plumbers typically install and repair pipes made of copper or PVC or other materials generally used to produce pipes. Assembling these pipes requires various liquid and semi-liquid compounds. Examples of such compounds include primers, glues, and flux. The pipes are usually located within ceilings, in crawl spaces, and other restricted spaces. Limited space is the norm; therefore carrying tools is a challenge. Further, the liquids and flux used are most often carried in containers sealed by screw-on or snap-on caps. Leaving caps off of the containers can cause the liquids and semi-liquids to harden or to become contaminated or to spill. A handy means of properly carrying the containers is needed. Further, a plumber needs a means for carrying and holding the containers so that only one hand is needed to remove a lid. The containers should also be carried so that they cannot fall out of any carrying device. Such a device should be able to firmly hold the containers as needed, and release the containers when needed. The capture and the release of the containers should be convenient and easy. The present plumber's caddy successfully addresses these concerns and needs.

FIELD OF THE INVENTION

The plumber's caddy relates to container carrying devices and more particularly to a caddy for firmly carrying containers used by plumbers and others.

DESCRIPTION OF THE PRIOR ART

Prior related art teaches various container holders and carriers but none which feature the advantages of the present plumber's caddy.

U.S. Pat. No. 5,992,624 issued to Hodson on Nov. 30, 1999 teaches a plumber's caddy designed to be secured to a joist-like member. The device does not address the concerns of the present plumber's caddy.

U.S. Pat. No. 3,680,752 issued to Wilson on Aug. 1, 1972 teaches a carrying handle for supporting multiple items. While the device is useful for such, it does not offer a means of snugly holding and releasing containers such as those used by a plumber.

U.S. Pat. No. 5,390,888 issued to Rogers on Feb. 21, 1995 teaches a suspended holder for supporting a container of paint and a brush. The device is designed to removably hook on rungs of a ladder or the like. While useful in that regard, the device does not offer the capability of the present caddy in supporting and snugly holding containers.

While the above-described devices fulfill their respective and particular objects and requirements, they do not describe a container carrier that provides for the advantages of the plumber's caddy. In this respect, the plumber's caddy substantially departs from the conventional concepts and designs of the prior art. Therefore, a need exists for an improved plumber's caddy.

SUMMARY OF THE INVENTION

The general purpose of the plumber's caddy, described subsequently in greater detail, is to provide a plumber's caddy which has many novel features that result in an improved plumber's caddy which is not anticipated, rendered obvious, suggested, or even implied by prior art, either alone or in combination thereof.

To attain this, the plumber's caddy comprises a tray with two opposing holders. The holders are attached via a vertical hinge on one end. The rear holder is permanently affixed to the tray. The front holder pivots away from the rear holder when two wing nuts are removed from the bolts. The bolts are affixed to the rear holder. The pivotal arrangement provides for the installation of containers between the semi-circles of the holders. When the front holder is pivoted back against and tightened to the rear holder a pair of wells is formed. The rear semi-circles of the rear holder match the front semi-circles of the front holder to form two circular containments. There exists a brief interruption of a complete circle when the front and rear holders are positioned together. The interruption is comprised of a gap formed by incomplete semi-circles of the front and rear holders. The interruption, or abbreviation, of the semi-circles is disposed medially in both front and rear semi-circles. The abbreviated semi-circles leave a gap between the rear transverse and the front transverse, thereby forming a pocket. The pocket is further bordered by containers when containers are installed within the wells of the caddy. The tray below the holders combines with the circular containments to form two wells that snugly hold containers until their release is desired. The caddy is preferably sized to fit quart-sized containers that are typically used by plumbers. The caddy supports the containers and allows a plumber to easily transport the containers. The freely rotating tube of the handle of allows greater comfort in use of the caddy. The handle is also free to pivot about the eyes to which it is fastened, thereby pivoting out of the way during use of the containers held within. The extrusion of the handle provides a better center of gravity for the caddy. The caddy firmly holds the containers so that only one hand is required to remove container lids, access the containers ingredients, and in return fasten the lids. The preparations within the containers are often highly viscous and resist a plumber in either opening or closing a container. Also, many of the containers used incorporate brushes into their lids. Often, when a brush is removed, the container lifts with the brush, either refusing to release the brush, or spilling the contents. By firmly holding the containers, the plumber's caddy allows the plumber to use only one hand in dealing with each container. With the other hand usually involved with tools or plumbing fixtures, one-handed accessibility offers a working advantage to anyone assuming a plumber's duties or someone requiring the features of the plumber's caddy. The plumber's caddy may be made of metal, plastics, PVC, or other appropriate materials.

More basic forms of the caddy are offered, each with an omission of preferred features. One embodiment omits the front and rear transverses and abuts the front semi-circles together and the rear semi-circles together. Still another embodiment omits the front and rear ears of the first front and rear semi-circles. The hinge of this embodiment is attached directly to the front and rear semi-circles.

Thus has been broadly outlined the more important features of the improved plumber's caddy so that the detailed description thereof that follows may be better understood and in order that the present contribution to the art may be better appreciated.

It is therefore an object of the plumber's caddy to provide for carrying more than one container.

It is also an object of the plumber's caddy to firmly hold containers.

It is a further object of the plumber's caddy to easily release containers.

It is an added object of the plumber's caddy to be of basic construction.

Additionally, it is an object of the plumber's caddy to provide a pocket for other typical plumber's tools.

And, it is an object of the plumber's caddy to provide a handle that pivots out of the way of materials stored within such containers.

These together with additional objects, features and advantages of the improved plumber's caddy will be readily apparent to those of ordinary skill in the art upon reading the following detailed description of presently preferred, but nonetheless illustrative, embodiments of the improved plumber's caddy when taken in conjunction with the accompanying drawings.

In this respect, before explaining the current embodiments of the improved plumber's caddy in detail, it is to be understood that the plumber's caddy is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved plumber's caddy. It is therefore important that the claims be regarded as including such equivalent constructions insofar as they do not depart from the spirit and scope of the plumber's caddy. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the plumber's caddy generally designated by the reference number 10 will be described.

Figure 1:
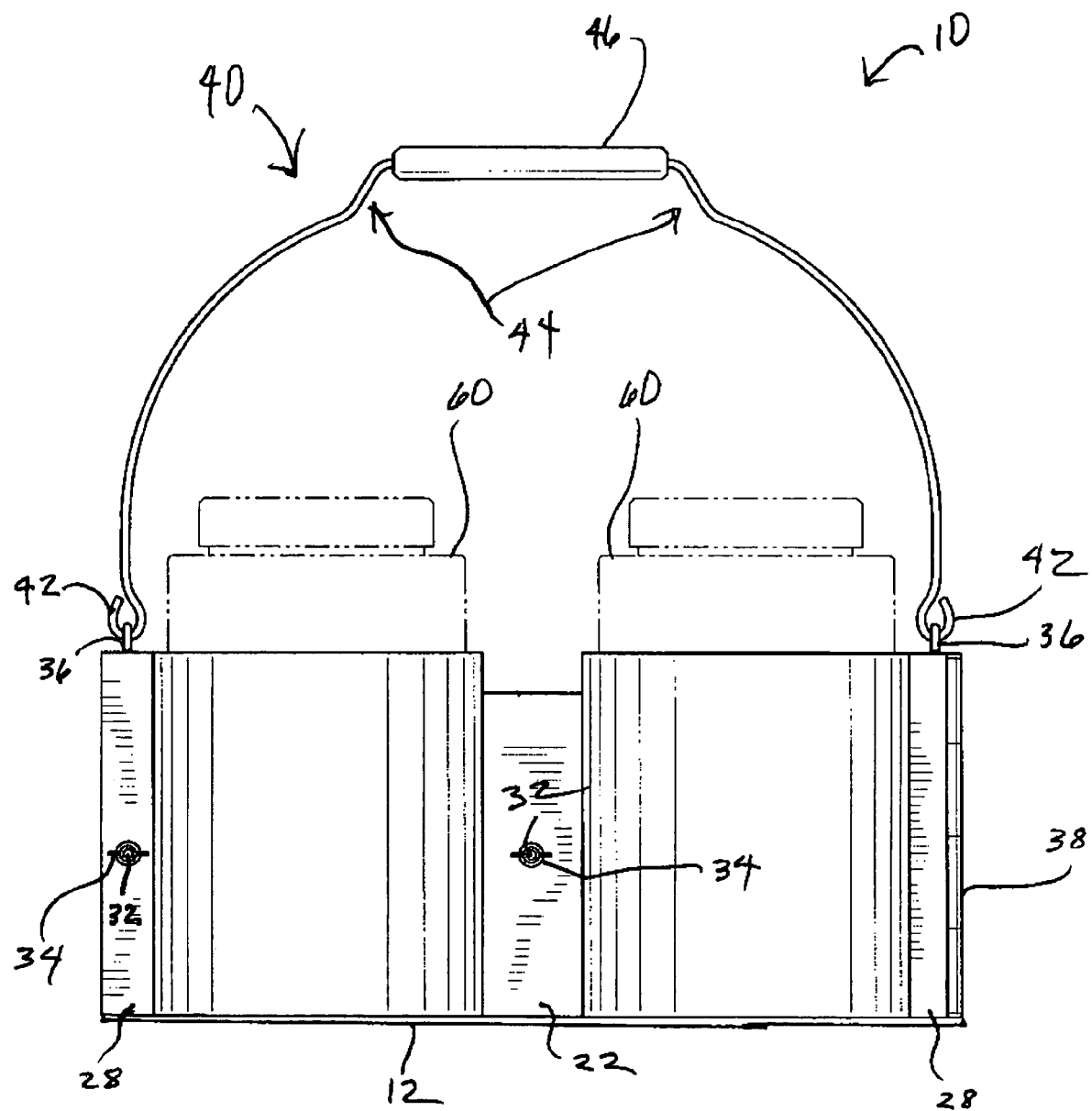
FIG. 1 is a front elevation view.
Figure 2:
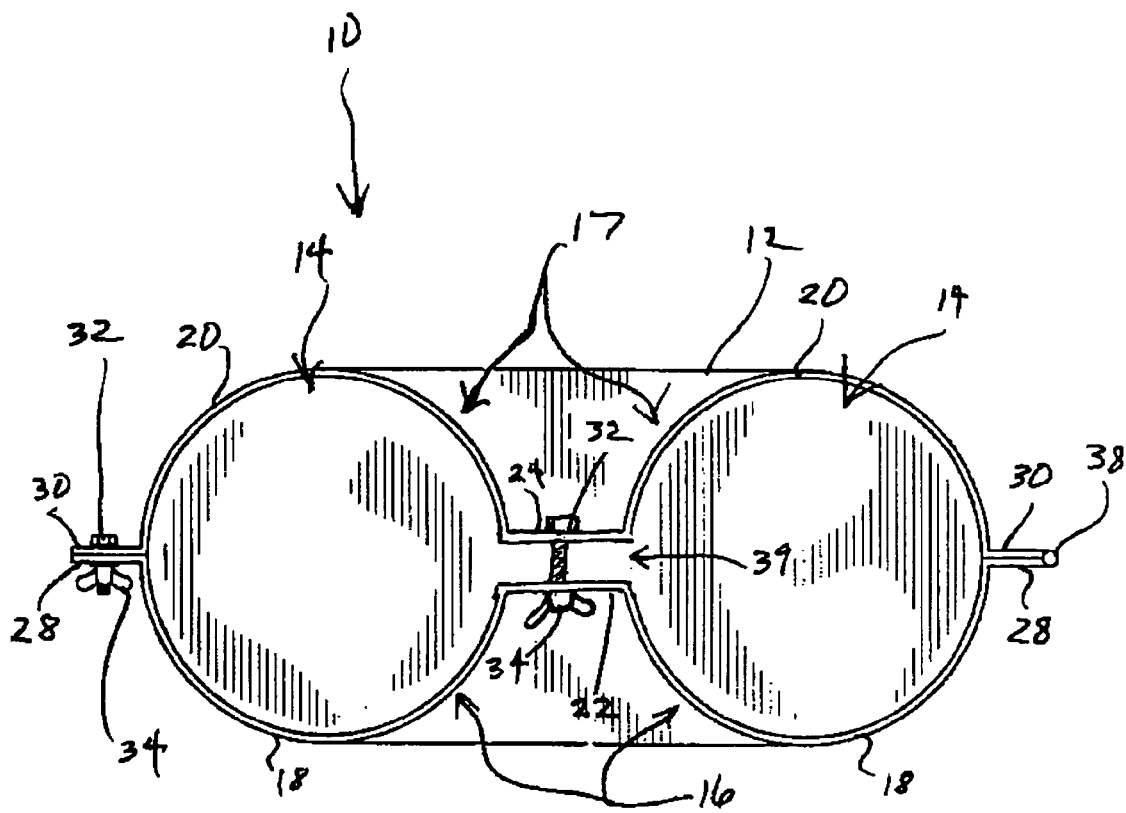
FIG. 2 is a top plan view illustrating the front holder tightened to the rear holder.

Referring to FIG. 1, the caddy 10 can carry two quart-sized containers 60. A hinge 38 joins the front holder 16 to the rear holder 17 (FIG. 2). The handle 40 pivotally engages the eyes 36 of the rear holder 17. The handle 40 is comprised of two opposed risers 41 joined by the extrusion 44. The semi-circular handle 40 extrusion 44 is fitted with the freely rotating tube 46 for user comfort, so that the tube 46 can be gripped with the handle 40 free to rotate within the tube 46. The front holder 16 is held to the rear holder 17 via the wing nuts 32 tightened to threads of the bolts 32.

Figure 3:
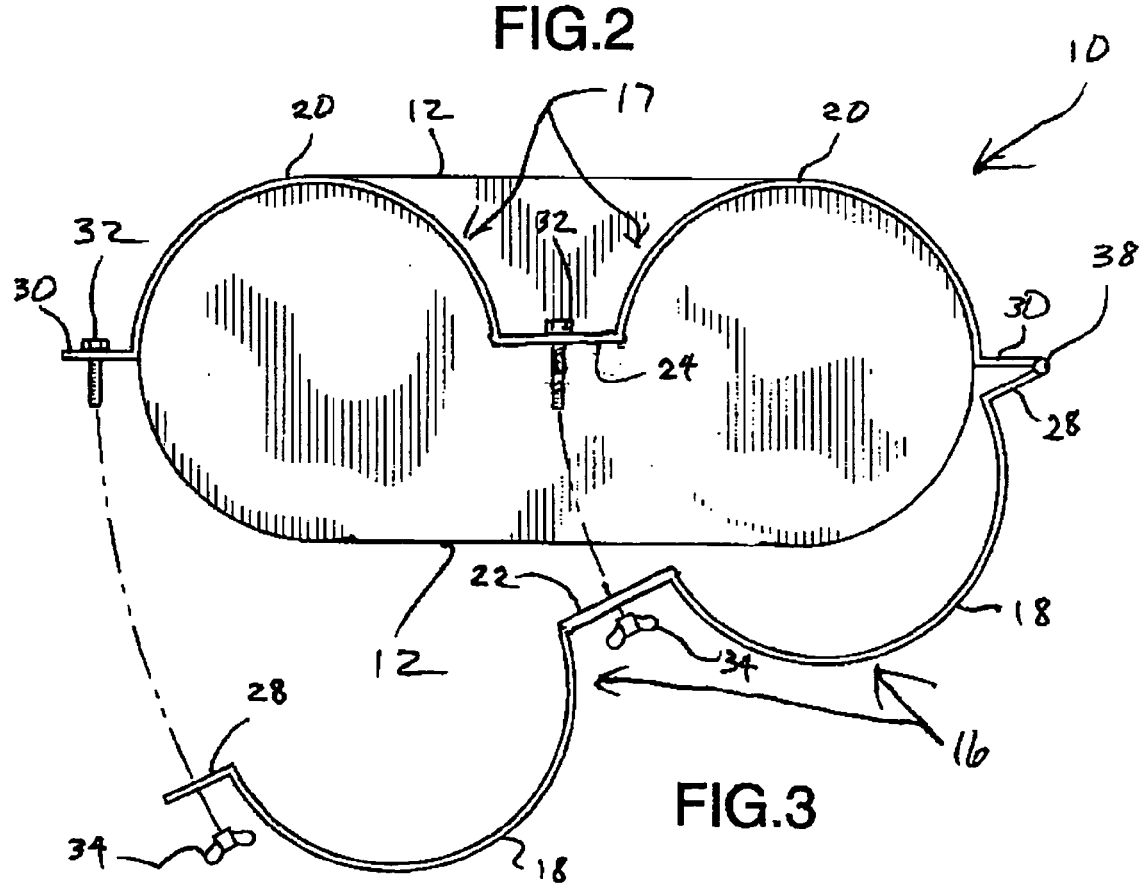
FIG. 3 is a top plan view illustrating the front holder pivoted away from the rear holder.

Referring to FIGS. 2 and 3, the portable caddy 10 comprises a flat tray 12. The tray 12 comprises two spaced apart sides and two spaced apart oval ends, a top and a bottom. The tray 12 is differentiated into a front half and a back half for explanation purposes. The rear holder 17 has a height with a top and a bottom. The bottom of the rear holder 17 is permanently affixed atop the back half of the tray 12 such that the rear holder 17 is perpendicular to the tray 12. The rear holder 17 comprises a first rear semicircle 20 and a second rear semicircle 20. Each rear semi-circle 20 is abbreviated on the medial side of the rear holder 17. The rear transverse 24 connects the two rear semicircles 20. A bolt 32 is permanently affixed through the rear transverse 24.

The thread of the bolt 32 faces toward the front half of the tray 12. The rear ear 30 is disposed on one end of the first rear semicircle 20. The rear ear 30 is on an end of the first rear semicircle 20 opposite the rear transverse 24. A second rear ear 30 is disposed on one end of the second rear semicircle 20. The second rear ear 30 is on an end of the second rear semicircle 20 opposite the rear transverse 20. A bolt 32 is permanently affixed through the rear ear 30 of the second rear semicircle 20. The thread of the bolt 32 faces toward the front half of the tray 12. The front holder 16 has a top and a bottom. The front holder 16 comprises a first front semicircle 18 and a second front semicircle 18. Each of the front semi-circles 18 is abbreviated on the medial side of the front holder 16. The front transverse 22 connects the two front semicircles 18. A hole is disposed in the front transverse 22. The hole aligns with the bolt 32 of the rear transverse 24. A front ear 28 is disposed on one end of the first front semicircle 18. The front ear 28 is on an end of the first front semicircle 18 opposite the front transverse 22. A front ear 28 is disposed on one end of the second front semicircle 18. The front ear 28 is on an end of the second front semicircle 18 opposite the front transverse 22. A hole is through the front ear 28 of the second front semicircle 18. The hole aligns with the bolt 32 of the rear ear 30 of the second rear semicircle 20. A wing nut 34 is provided for each bolt 32. The hinge 38 joins the front holder 16 to the rear holder 17. The hinge 38 is affixed from top to bottom to the rear ear 30 of the first rear semi-circle 20 and the front ear 28 of the first front semi-circle 18, thereby hingedly connecting the rear ear 30 to the front ear 28.

The hinge 38 connection provides for the front holder 16 to pivot outward from the tray 12 and the rear holder 17 when the wing nuts 34 are removed from the bolts 32. Pivoting the front holder 16 outwardly provides for the installation or removal of the containers 60. Pivoting the front holder 16 inwardly forms the wells 14 for holding containers 60. Tightening the wing nuts 34 to the bolts 32 snugly holds the containers 60 in place. The medial abbreviation of the front semi-circles 18 and the rear semi-circles 20 causes the front transverse 22 and the rear transverse 24 to form a pocket 39 when the front holder 16 and the rear holder 17 are positioned together. The pocket 39 is further enhanced when containers 60 are installed within the wells 14, as the containers 60 act as additional walls for the pocket 39. The pocket 39 provides for further tool storage.

Figure 4:
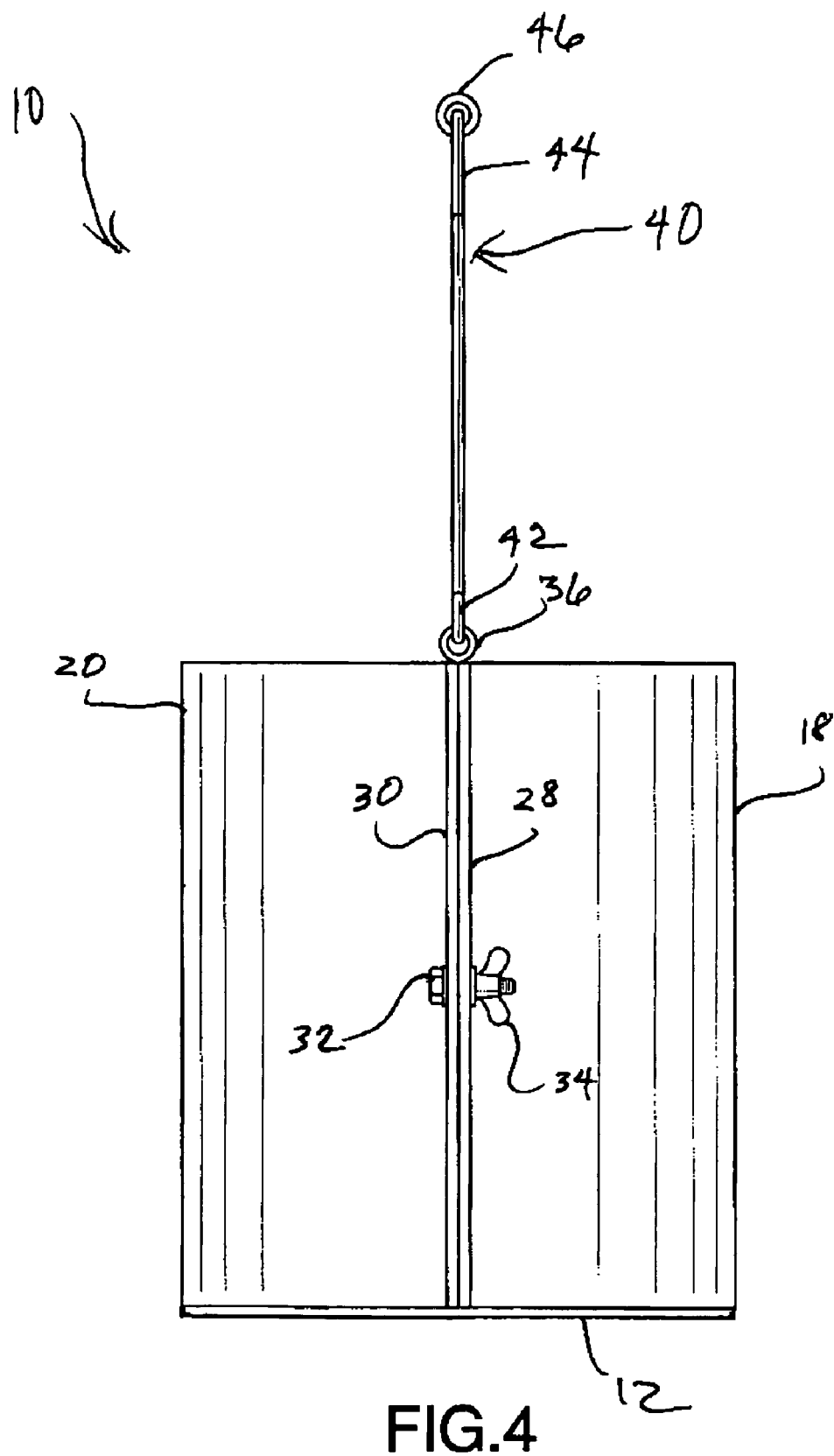
FIG. 4 is a side elevation view.

Referring to FIG. 4, an eye 36 is affixed atop of each of the rear ears 30. The semi-circular handle 40 has a hook 42 disposed on each of the opposite ends of the handle 40. Each hook 42 is engaged with an eye 36 of one of the rear ears 30, respectively. The handle 40 has two opposite ends and a center. The handle 40 further comprises an extrusion 44 proximal to the center of the handle 40. A freely turning tube 46 is disposed around a center of the extrusion 44, thereby providing a freely pivoting handle grip tube 46 for a user.

With respect to the above description then, it is to be realized that the optimum dimensional relationships for the parts of the plumber's caddy, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the plumber's caddy.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the plumber's caddy may be used.

Therefore, the foregoing is considered as illustrative only of the principles of the plumber's caddy. Further, since numerous modifications and changes will readily occur to those skilled in the art, it is not desired to limit the plumber's caddy to the exact construction and operation shown and described, and accordingly, all suitable modifications and equivalents may be resorted to, falling within the scope of the plumber's caddy.

What is claimed is:

1. A plumber's caddy, the caddy for removably holding two containers, the caddy comprising:
   a flat tray, the tray having two spaced apart sides, two spaced apart ends, a top and a bottom, a front half and back half located on top;
   a rear holder, the rear holder having a height with a top and a bottom, the bottom of the rear holder permanently affixed to the back half of the tray, whereby the height of the rear holder is perpendicular to the tray;
   a handle fastened to the top of the rear holder;
   a pair of rear semi-circle of the rear holder, comprising a first rear semi-circle and a second rear semi-circle, each rear semi-circle having a medial side and a lateral side;
   a movable front holder mounted on front half;
   a pair of front semi-circles of the front holder, comprising a first front semi-circle and a second front semi-circle, each front semi-circle having a medial side and a lateral side, whereby the front holder is a mirror image of the rear holder;
   a hinge affixed to the lateral side of corresponding first front and first rear semicircles of the front holder and the rear holder, respectively, whereby the front holder pivots from the rear holder;
   a means for selectively fastening the front holder to the rear holder, whereby fastening the holders forms two separate wells between the front holder and the rear holder semi-circles;
   wherein the handle is pivotally fastened to the rear holder;
   wherein the rear holder further comprises a pair of spaced apart eyes;
   the pivoting handle comprises:
      a semi-circular handle, the handle having two opposite ends and a center;
      a hook on each of the opposite ends, each hook engaged with one of the eyes of the rear holder.

2. The caddy in claim 1 wherein the handle is further comprised of:
   an extrusion proximal to the center of the handle;
   a freely turning tube around a center of the extrusion.

3. A plumber's caddy, the caddy for removably holding two containers, the caddy comprising:
   a flat tray, the tray having two spaced apart sides, two spaced apart ends, a top and a bottom, a front half and back half located on top;
   a rear holder, the rear holder having a height with a top and a bottom, the bottom of the rear holder permanently affixed to the back half of the tray, whereby the height of the rear holder is perpendicular to the tray;
   a handle fastened to the top of the rear holder;
   a pair of rear semi-circle of the rear holder, comprising a first rear semi-circle and a second rear semi-circle, each rear semi-circle having a medial side and a lateral side;
   a movable front holder mounted on front half;
   a pair of front semi-circles of the front holder, comprising a first front semi-circle and a second front semi-circle, each front semi-circle having a medial side and a lateral side, whereby the front holder is a mirror image of the rear holder;
   a hinge affixed to the lateral side of corresponding first front and first rear semicircles of the front holder and the rear holder, respectively, whereby the front holder pivots from the rear holder;
   a means for selectively fastening the front holder to the rear holder, whereby fastening the holders forms two separate wells between the front holder and the rear holder semi-circles;
   wherein the semi-circles further comprise:
      a rear ear on the lateral side of the second rear semi-circle;
      a front ear of the lateral side of the second front semi-circle;
      a means for selectively fastening the front ear of the second front semi-circle to the to the rear ear of the second rear semi-circle.

4. A plumber's caddy, the caddy for removably holding two containers, the caddy comprising:
   a flat tray, the tray having two spaced apart sides, two spaced apart ends, a top and a bottom, a front half and back half located on top;
   a rear holder, the rear holder having a height with a top and a bottom, the bottom of the rear holder permanently affixed to the back half of the tray, whereby the height of the rear holder is perpendicular to the tray;
   a handle fastened to the top of the rear holder;
   a pair of rear semi-circle of the rear holder, comprising a first rear semi-circle and a second rear semi-circle, each rear semi-circle having a medial side and a lateral side;
   a rear ear on the lateral side of the second rear semi-circle;
   a movable front holder mounted on front half;
   a pair of front semi-circles of the front holder, comprising a first front semi-circle and a second front semi-circle, each semi-circle having a medial side and a lateral side, whereby the front holder is a mirror image of the rear holder;
   a front ear on the lateral side of the second front semi-circle;
   a hinge affixed to a lateral side of corresponding first front and first rear semicircles of the front holder and the rear holder, respectively, whereby the front holder pivots from the rear holder;
   a bolt permanently affixed in the rear ear of the second rear semi-circle;
   a hole in the front ear of the second front semi-circle, the hole corresponding to the bolt of the rear ear of the second rear semi-circle;
   a wing nut for the bolt;
   whereby the front holder is selectively fastened to the rear holder.

5. The caddy in claim 4 wherein the handle is pivotally fastened to the rear holder.

6. The caddy in claim 5 wherein the rear holder further comprises a pair of spaced apart eyes;
   the pivoting handle comprises:
      a semi-circular handle, the handle having two opposite ends and a center;
      a hook on each of the opposite ends, each hook engaged with one of the eyes of the rear holder.

7. The caddy in claim 6 wherein the handle is further comprised of:
   an extrusion proximal to the center of the handle;
   a freely turning tube around a center of the extrusion.

8. The caddy in claim 5 wherein the handle is further comprised of:
   an extrusion proximal to the center of the handle;
   a freely turning tube around a center of the extrusion.

9. A plumber's caddy, the caddy for removably holding two containers, the caddy comprising:
   a flat tray, the tray having two spaced apart sides, two spaced apart ends, a top and a bottom, a front half and back half located on top;
   a rear holder, the rear holder having a height with a top and a bottom, the bottom of the rear holder permanently affixed to the back half of the tray, whereby the height of the rear holder is perpendicular to the tray;
   a pair of rear semi-circle of the rear holder, comprising a first rear semi-circle and a second rear semi-circle, each rear semi-circle having a medial side and a lateral side;
   a rear transverse connecting the medial sides of the rear semi-circles;
   a rear ear on the lateral side of the first rear semi-circle;
   a rear ear on the lateral side of the second rear semi-circle;
   a semi-circular handle, the handle having two ends, each of the ends fastened to a top of one of the rear ears;
   a front holder mounted on front half, the front holder having a top and a bottom;
   a pair of front semi-circles of the front holder, comprising a first front semi-circle and a second front semi-circle, each semi-circle having a medial side and a lateral side, the front holder a mirror image of the rear holder;
   a front transverse connecting the medial sides of the front semi-circles;
   a front ear on the lateral side of the first front semi-circle, the front ear a mirror image of the rear ear of the first rear semi-circle;
   a front ear on the lateral side of the second front semi-circle, the front ear a mirror image of the rear ear on the second rear semi-circle;
   a hinge affixed to a lateral side of the ears of the corresponding first front and first rear semicircles of the front holder and the rear holder, respectively, whereby the front holder pivots from the rear holder;
   a bolt permanently affixed in the rear ear of the second rear semi-circle;
   a hole in the front ear of the second front semi-circle, the hole corresponding to the bolt of the rear ear of the second rear semi-circle;
   a wing nut for the bolt,
   whereby the front holder is selectively fastened to the rear holder.

10. The caddy in claim 9 wherein the transverse of the rear holder is further comprised of a permanently affixed bolt;
    a hole in the front transverse of the front holder, the hole corresponding to the bolt in the rear transverse;
    a wing nut for the bolt, whereby the front holder is selectively fastened to the rear holder.

11. The caddy in claim 10 wherein the medial sides of the rear semi-circles are abbreviated;
    the medial sides of the front semi-circles are abbreviated, whereby the rear transverse and front transverse do not meet, a pocket between the two transverses thereby formed upon pivotal positioning of the front and rear holders together.

12. The caddy in claim 11 wherein the handle is pivotally fastened to the rear holder.

13. The caddy in claim 12 wherein the rear holder further comprises a pair of spaced apart eyes;
    the pivoting handle comprises:
       a semi-circular handle, the handle having two opposite ends and a center;
       a hook on each of the opposite ends, each hook engaged with one of the eyes of the rear holder.

14. The caddy in claim 13 wherein the handle is further comprised of:
    an extrusion proximal to the center of the handle;
    a freely turning tube around a center of the extrusion.

15. The caddy in claim 10 wherein the handle is pivotally fastened to the rear holder.

16. The caddy in claim 9 wherein the medial sides of the rear semi-circles are abbreviated;
    the medial sides of the front semi-circles are abbreviated, whereby the rear transverse and front transverse do not meet, a pocket between the two transverses thereby formed upon pivotal positioning of the front and rear holders together.

17. The caddy in claim 16 wherein the handle is pivotally fastened to the rear holder.

* * * * *